United States Patent [19]

Barr et al.

[11] Patent Number: 5,670,462

[45] Date of Patent: Sep. 23, 1997

[54] LUBRICATING OIL ADDITIVES

[75] Inventors: Douglas McP. Barr, Brighton; David J. Moreton, Hull; Alexander F. Psaila, North Humberside, all of United Kingdom

[73] Assignee: BP Chemicals (Additives) Limited, London, England

[21] Appl. No.: 439,452

[22] Filed: May 11, 1995

[30] Foreign Application Priority Data

May 11, 1994 [GB] United Kingdom .................. 9409346

[51] Int. Cl.$^6$ .................................................. C10M 149/10
[52] U.S. Cl. ........................ 508/291; 508/290; 508/454; 525/327.6; 525/375
[58] Field of Search ...................... 252/51.5 A; 508/290, 508/291

[56] References Cited

U.S. PATENT DOCUMENTS

| | | | |
|---|---|---|---|
| 3,365,399 | 1/1968 | Verdol et al. | 252/51.5 A |
| 3,455,827 | 7/1969 | Mehmedbasich et al. | 508/291 |
| 5,137,980 | 8/1992 | DeGonia et al. | 252/51.5 A |
| 5,241,003 | 8/1993 | DeGonia et al. | 252/51.5 A |
| 5,275,747 | 1/1994 | Gutierrez et al. | 252/51.5 A |
| 5,356,550 | 10/1994 | Cook et al. | 252/51.5 A |

FOREIGN PATENT DOCUMENTS

| | | |
|---|---|---|
| 0 146 162 | 6/1985 | European Pat. Off. . |
| 0 355 895 | 2/1990 | European Pat. Off. . |
| 0 365 288 | 4/1990 | European Pat. Off. . |
| 0 587 381 A1 | 3/1994 | European Pat. Off. . |

*Primary Examiner*—Ellen M. McAvoy
*Attorney, Agent, or Firm*—Nixon & Vanderhye PC

[57] ABSTRACT

A process is disclosed which comprises reacting at elevated temperature (a) a copolymer of an olefin and a monomer having the structure

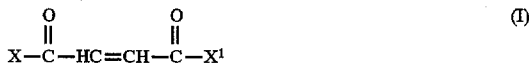

wherein $X$ and $X^1$ are the same or different provided that at least one of $X$ and $X^1$ is such that the copolymer can function as a carboxylic acylating agent and (b) a succinimide prepared from an acyclic hydrocarbyl substituted succinic acylating agent and a polyamine wherein the hydrocarbyl substituted succinic acylating agent is prepared by reacting a polyolefin and an acylating agent of formula I under conditions such that at least 75 mole % of the starting polyolefin is converted to the hydrocarbyl-substituted succinic acylating agent. Hydrocarbyl substituted succinic acylating agents derived from high reactivity PIB's are preferred.

15 Claims, No Drawings

LUBRICATING OIL ADDITIVES

The present invention relates generally to additives for use in lubricating oil compositions and processes for producing said additives. In particular, the present invention relates to additives for use as dispersants having viscosity index improver properties.

Operation of internal combustion engines is accompanied by the formation of piston varnish and sludge in the crankcase and in the oil passages of the engine. The sludge and varnish seriously restrict the ability of the crankcase oil to satisfactorily lubricate the engine. Furthermore, the sludge with its entrapped water tends to contribute to rust formation in the engine. To combat the varnish and sludge in internal combustion engines it has long been the practice to incorporate, into the lubricating oil, additives in the form of dispersants. The dispersants function to disperse the components of varnish and sludge throughout the oil and thereby prevent their accumulation.

It has long been known to use nitrogen-containing compounds as dispersants and/or detergents. Many of the known nitrogen-containing dispersants and/or detergent compounds are based on the reaction of an alkenylsuccinic acid or anhydride with an amine or polyamine to produce an alkenylsuccinimide or an alkenylsuceinamic acid depending upon the nature of the reactants and the reaction conditions.

More recently, the operating demands placed on internal combustion engines have led to a desirability for the dispersant additive to make a viscosity index improver contribution to the additive package sufficient to permit elimination of all or a significant amount of the viscosity index improver additive conventionally employed in such packages. In this connection there may be mentioned as representative of the prior art U.S. Pat. No. 3,365,399 and our EP-A-0365288.

U.S. Pat. No. 3,365,399 discloses the addition to a base oil of lubricating viscosity of small effective amounts of the base oil-soluble reaction product of a monoamine, e.g. octadecylamine, and certain polyamines, e.g. diethylaminopropylamine, with a polymer resin of a monovinyl compound of 2 to 12 carbon atoms and maleic anhydride, e.g. a polymer of styrene and maleic anhydride, provides the base oil with excellent dispersant properties as well as excellent basicity by virtue of the nitrogen atoms present and additionally improved pour point and viscosity index.

EP-A-0365288 discloses a process for producing a dispersant/VI improver, that is a product which acts primarily as a dispersant but which may also have viscosity index improving properties, for use in finished lubricating oil compositions which process comprises reacting in a normally liquid substantially inert organic solvent (a) a copolymer of an olefin and a monomer having the structure:

(I)

wherein X and $X^1$ are the same or different provided that at least one of X and $X^1$ is such that the copolymer can function as a carboxylic acylating agent, (b) a succinimide, and (c) a primary or secondary amine, or a mixture thereof.

We have now found that by using a succinimide derived from a hydrocarbyl-substituted succinic acylating agent and polyamine where the succinic acylating agent is produced in high conversion from a polyolefin and monomer of formula (I), then dispersants having improved viscometrics can be produced.

Accordingly, the present invention provides a process comprising reacting at elevated temperature (a) a copolymer of an olefin and a monomer having the structure

(I)

wherein X and $X^1$ are the same or different provided that at least one of X and $X^1$ is such that the copolymer can function as a carboxylic acylating agent, and (b) a succinimide prepared from an acyclic hydrocarbyl substituted succinic acylating agent and a polyamine wherein the hydrocarbyl substituted succinic acylating agent is prepared by reacting a polyolefin and an acylating agent of formula I under conditions such that at least 75 mole % of the starting polyolefin is converted to the hydrocarbyl-substituted succinic acylating agent.

In a further aspect of the present invention there is provided a lubricating oil additive concentrate, in particular a dispersant/VI improver prepared by the process as hereinabove defined.

Reactant (a) is a copolymer of an olefin and a monomer having the structure (I). It is understood that such a copolymer is produced by copolymerisation of olefin and monomer having the structure I as opposed to reaction of the monomer having structure I with a preformed polyolefin. The olefin: monomer molar ratio in the copolymer is preferably 1:2 to 2:1, more preferably about 1:1.

As regards the olefin, this may be any polymerisable olefin characterised by the presence of one or more ethylenically unsaturated groups. The olefin may be either a terminal olefin or an internal olefin, preferably a terminal olefin. Although it is preferred to employ olefinic hydrocarbons, the olefin may contain non-hydrocarbon groups, for example alkoxy or hydroxy groups. Examples of suitable olefin monomers include 1-hexene, octadecene-1 and diisobutylene. The olefin preferably is a $C_4$–$C_{30}$ olefin.

As regards the monomer having the structure (I), at least one, and preferably both X and $X^1$ must be such that the copolymer can esterify alcohols, form amides or amine salts with ammonia or amines, form metal salts with reactive metals or basically reacting metal compounds, and otherwise function as a conventional carboxylic acid acylating agent. Thus X and/or $X^1$ can be —OH, —O—hydrocarbyl, —$NH_2$, —Cl, Br, or together can be an oxygen atom so as to form the anhydride. Preferably X and/or $X^1$ are either —OH or together are an oxygen atom, more preferably X and $X^1$ are together an oxygen atom, i.e. the monomer having the structure (I) is maleic anhydride.

A range of suitable olefin/monomer copolymers wherein the monomers have the structure (I) are commercially available. The molecular weight of said copolymer is preferably in the range 2,000–50,000, typically about 5,000–30,000. A preferred copolymer is a copolymer of polyoctadecene-1 and maleic anhydride. This can be readily prepared by refluxing a mixture of octadecene-1 and maleic anhydride in a hydrocarbon solvent in the presence of a free radical polymerisation initiator. A suitable method is described in, for example, GB-A-1,121,464 (Monsanto Co.).

Reactant (b) is a succinimide prepared from an acyclic hydrocarbyl-substituted succinic acylating agent and a polyamine.

The acyclic hydrocarbyl substituted succinic acylating agent is prepared by reacting a polyolefin and an acylating agent of formula I under conditions such that at least 75 preferably 80, more preferably 85 mole% of the starting polyolefin is convened to the acyclic hydrocarbyl substituted succinic acylating agent.

The acyclic hydrocarbyl substituent of the succinic acylating agent may suitably be either an alkyl or alkenyl group, preferably an alkyl group. The substituent is suitably derived from a polyolefin homopolymer or copolymer having a number average molecular weight in the range from about 500 to about 5000, typically from 750 to 1500. The olefin suitably has from 2 to 16 carbon atoms, preferably from 2 to 6 carbon atoms. The copolymers include random, block and tapered copolymers. Suitable olefin monomers include ethylene, propylene, butenes, isobutene and pentenes. The acyclic hydrocarbyl substituent is preferably derived from a polyisobutene (PIB). There may be used to advantage highly reactive PIBs, that is PIBs wherein greater than 50%, preferably greater than 65%, more preferably greater than 80% of the residual olefinic double bonds are of the vinylidene type, i.e. represented by the formula:

(I)

Highly reactive PIBs are commercially available in the form of ULTRAVIS (RTM) from BP Chemicals Limited and GLISSOPAL (RTM) from BASF.

Alternatively, there may be used PIBs wherein less than 50% of the olefin double bonds are of the vinylidene type provided that at least 75 mole% of the starting PIB is converted to the PIB substituted succinic acylating agent. These, too, are commercially available as HYVIS (RTM) from BP Chemicals Limited, amongst others. Mixtures of PIBs may also be used in the derivation of the acyclic hydrocarbyl substituent. It is preferred to use a mixture of a PIB having a molecular weight in the range from 750 to 1500 with up to 40% by weight of a PIB having a molecular weight greater than 1500, for example up to 5000, typically about 2400.

Acyclic hydrocarbyl-substituted succinic acylating agents include the hydrocarbyl-substituted succinic acids, the hydrocarbyl-substituted succinic anhydrides, the hydrocarbyl-substituted succinic acid halides, and the esters of the hydrocarbyl-substituted succinic acids, anhydrides or halides and lower alcohols, for example $C_1$ to $C_6$ alcohols, that is hydrocarbyl-substituted compounds which can function as carboxylic acylating agents. Of these compounds the hydrocarbyl-substituted succinic acids and the hydrocarbyl-substituted succinic anhydrides and mixtures of such acids and anhydrides are preferred. More preferred are the hydrocarbyl-substituted succinic anhydrides, in particular PIB succinic anhydrides.

The succinic acylating agent is preferably made by reacting a polyolefin as described hereinbefore, in the presence or the absence of a halogen, preferably chlorine, at elevated temperature with maleic anhydride. Halogen-free products, preferred in certain applications, are ultimately obtainable by avoiding the use of halogen at this stage in the preparation of succinimide dispersants. As an alternative to maleic anhydride there may be used, for example, maleic acid, fumaric acid, malic acid, itaconic acid, itaconic anhydride, and the like. Where the polyolefin (e.g. PIB) is a polyolefin wherein less than 50% of the olefin double bonds are vinylidene, the succination is likely to be carried out in the presence of chlorine; in this case the reaction can be carded out in 2 steps, the first step being the chlorination of the polyolefin, the second step being the reaction of the chloro derivative with the maleic anhydride or like product.

Reactant (b) is prepared from a succinic acylating agent as described above and a polyamine which can be an alkylene polyamine. Suitable alkylene polyamines are those of the formula:

$$HR^2N(R^1NH)_xR^1NHR^3$$ (II)

wherein $R^1$ is an alkylene moiety of 2 to 10 carbon atoms, $R^2$ and $R^3$ are independently either hydrogen, alkyl groups, preferably $C_1$ to $C_6$ alkyl groups, more preferably methyl or ethyl, or hydroxy alkyl, preferably $C_1$ to $C_6$ hydroxyalkyl and x is an integer in the range from 0 to 10. The alkylene moiety $R^1$ preferably has from 2 to 6 carbon atoms and is more preferably either ethylene or propylene or a mixture thereof. $R^2$ and $R^3$ in the formula (II) are preferably both hydrogen. x preferably is equal to or greater than 2. Examples of alkylene polyamines having the formula (II) include diethylene triamine, triethylene tetramine, tripropylene tetramine, tetraethylene pentamine, tetrapropylene pentamine and pentaethylene hexamine. A preferred alkylene polyamine is tetraethylene pentamine. Alternatively, instead of the alkylene polyamine there may be used one or more polyoxyalkylene polyamines having the formula:

$$H_2N\text{-alkylene}(O\text{-alkylene})_m NH_2$$ (III)

Where m has a value of about 3 to 70, preferably 10 to 35. The polyoxyalkylene polyamine of the formula (III), may suitably have average molecular weights ranging from about 200 to about 4000, preferably from about 400 to about 2000. Preferred polyoxyalkylene polyamines include the polyoxyethylene and polyoxypropylene diamines and the polyoxypropylene triamines having average molecular weights of from about 200 to 2000. The polyoxyalkylene polyamines are commercially available and may be obtained, for example, from the Jefferson Chemicals Company Inc. under the trade name JEFFAMINES (RTM), e.g. D-230, D-400, D-1000, D-2000, T-403 etc.

Reactants (a) and (b) are preferably reacted in the presence of a normally liquid substantially inert organic solvent. Preferably the solvent is a high-boiling hydrocarbon solvent. Examples of suitable such solvents include higher carbon number paraffins and liquid polyolefins. In view of the intended use of the product it is preferred to employ as the solvent an oil of lubricating viscosity. Both natural and synthetic oils may be employed. Solvent neutral (SN) oils, for example SN150 oil, are the oils of choice.

Reactant (b) may be added to reactant (a) as a pre-formed succinimide or as the precursors of reactant (b) i.e. the acyclic hydrocarbyl substituted succinic acylating agent and a polyamine.

The ratio of reactants (a) to (b) to solvent is suitably such that the product of the reaction forms a concentrate composition in the solvent. The concentrate composition suitably comprises from 10 to 80% by weight of the product.

The elevated temperature at which reactants (a) and (b) are reacted may suitably be in the range from 75° to 300° C., preferably from 150° to 250° C.

Optionally there may be incorporated into the reaction mixture as reactant (c) a primary or a secondary hydrocarbyl monoamine (or a mixture therof) wherein the hydrocarbyl substituent is of a length such as to render the product soluble in the solvent therefor. Suitable amines have the formula:

(IV)

wherein $R^1$ is either a saturated or an unsaturated aliphatic hydrocarbyl group, and $R^2$ is either $R^1$ or hydrogen, and the total number of carbon atoms in the groups $R^1$ and $R^2$ is at least 6 and as high as 50.

Preferably $R^2$ in the formula (IV) is hydrogen, i.e. the amine is a primary amine. Preferably $R^1$ is an alkyl group. Preferably the total number of carbon atoms in the groups $R^1$ and $R^2$ is in the range from 8 to 20, more preferably from 10 to 18. Examples of suitable amines include octadecylamine and dodecylamine. An example of a suitable mixture of amines is tallow amine (a partially saturated mixture of amines comprised mainly of $C_{18}$ amines).

There may also be incorporated into the reaction mixture a compound having at least two primary or secondary amino groups separated by at least three carbon atoms (reactant (d)). An example of a compound suitable for use as reactant (d) is diaminododecane. It is possible to use polyalkylene polyamines or polyoxyalkylene polyamines as reactant (d). Suitable polyalkylene polyamines are polyethylene polyamines for example tetraethylene pentamine (TEPA) and triethylenetetramine (TETA).

The process can be effected simply by mixing the reactants (a) and (b), solvent and optionally (c) and (d), suitably at room temperature, raising the temperature thereafter to the desired elevated temperature and holding the mixture at the elevated temperature for a time sufficient to complete the reaction.

One method of operating the process comprises in a first step reacting reactant (a) with reactant (d) in the presence of the solvent at a temperature in the range from 100° to 200° C., for example about 140° C., in a second step reacting the product of the first step with reactant (c) at a temperature in the range from 100° to 200° C. and in a third step reacting the product of the second step with reactant (b) at a temperature in the range from 100° to 200° C.

Furthermore we have found that if instead of using a preformed succinimide in the process of EP-A-0635288 referred to above there are used the precursors of a succinimide, there can be obtained a comparable product. By eliminating a step in the process of EP-0365288 the process is rendered more economical. In this case, the process and products thereof are as detailed above with the proviso that the succinimide is added to the copolymer (a) in the form of its precursors i.e. the acyclic hydrocarbyl substituted succinic acylating agent and a polyamine, and that the hydrocarbyl substituted succinic acylating agent is not restricted with regard to the extent of conversion of the starting polyolefin in its preparation.

Accordingly, there is provided a process comprising reacting at elevated temperature preferably in a normally liquid substantially inert organic solvent:

(a) a copolymer of an olefin and a monomer having the structure:

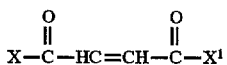

(I)

wherein X and $X^1$ are the same or different provided that at least one of X and $X^1$ is such that the copolymer can function as a carboxylic acylating agent, (b) an acyclic hydrocarbyl-substituted succinic acylating agent, and (c) an alkylene polyamine.

In a further aspect the present invention provides a finished lubricating oil composition comprising a major proportion of lubricating oil and a minor proportion of the concentrate prepared by the processes as hereinbefore described. Typically a lubricating oil composition will comprise 2–30% by weight of the concentrate preferably 5–15% for example 10%.

Any oil of lubricating viscosity may be used in the composition. Thus animal, vegetable or mineral oils may be employed. Mineral oils are preferred. Synthetic oils, including synthetic ester lubricating oils and polyolefins may also be used.

The finished lubricating oil composition may contain conventional additives, for example one or more of anti-wear additives, antioxidants, anti-rust additives, detergents, viscosity index improvers, and the like. It is an advantage of the present invention, however, that at least some of the VI improver additive conventionally present in lubricating oil compositions may be omitted. The conventional additives mentioned hereinbefore may be added either directly to the lubricating oil composition or to the concentrate composition.

The invention will now be further illustrated by reference to the following examples.

EXAMPLE 1

Into a 500 ml wide neck round bottom flask equipped with flange lid, condenser, overhead stirrer with paddle and gland, and a thermocouple connected to a Eurotherm/mantle heating system was charged:

(i) A 75 weight % solution of polyisobutene succinic anhydride (PIBSA) in SN150 mineral oil (161.8 g; 1.03 equivalents; 64 mmoles). The PIBSA was derived via a thermal route (85% conversion). The PIB substituent of the PIBSA was derived from a mixture of 40% GLISSOPAL (RTM) PIB of number average molecular weight 980 and 60% GLISSOPAL (RTM) PIB of number average molecular weight 2350. GLISSOPAL PIBs are highly reactive PIBs obtainable from BASF;

(ii) polyoctadecene/maleic anhydride copolymer (PODMA) (21.5 g; 1 equivalent; 62 mmoles of repeating units);

(iii) SN150 mineral oil (10.7 g) solvent;

(iv) octadecylamine (1.08 g; 0.06 equivalents; 4 mmol), and (v) diaminododecane (0.36 g; 0.03 equivalents; 1.8 mmol).

This mixture was heated with stirring to 140° C. and then tetraethylene pentamine (TEPA) (9.4 g; 0.79 equivalents; 49 mmol) was added at a rate which avoided excessive frothing. Thereafter the temperature was raised to 180° C. and the reactants were held at this temperature for 4 hours. At the end of this time the product was cooled and poured into jars.

The results of viscometric determinations on the products (as a 10% w/w solution in SN150 mineral oil) were as follows:

Viscosity at 100° C.=7.79 cSt
Viscosity at 40° C.=47.34 cSt
Viscosity at −20° C.=3270 cSt
Viscosity Index=133.

EXAMPLE 2

The apparatus described in Example 1 was assembled.

The same reagents as those described in Example 1 were employed in the same amounts but in a different reaction sequence as described hereinafter.

The apparatus was charged with the PIBSA and heated to 170° C. with stirring. The TEPA was then added at a rate such that excessive frothing was avoided. The ingredients were then heated with stirring at 170° C. for 3 hours. At the end of the 3 hour period PODMA, the SN150 mineral oil, octadecylamine and diaminododecane were added. The reaction mixture was then heated with stirring at 180° C. for 4 hours. The product was thereafter cooled and poured into jars.

The results of viscometric determinations on the products (as a 10% w/w solution in SN150 mineral oil) were as follows:

Viscosity at 100° C.=7.89 cSt

Viscosity at 40° C.=48.25 cSt

Viscosity at −20° C.=2130 cSt

Viscosity Index=133.

The results of Examples 1 and 2 demonstrate that there is no deterioration in VI when instead of using a preformed succinimide in the crosslinking reaction with PODMA there are used the precursors of the succinimide. The benefit in terms of reaction time at elevated temperature is readily apparent.

EXAMPLE 3

1 Step Using High Conversion PIBSA

A 500 ml round bottomed wide neck flask was charged with Glissopal PIBSA (85% conversion, 30% solution in SN150 lube oil, mixture of 40% MW 980, 60% MW 2350, 173.4 g, 64 mmol 1.03 equivalents) polyoctadecene maleic anhydride copolymer (PODMA), (25% solution in SN150, 86.0 g, 62 mmol of repeating units, 1 equivalent) and SN150 solvent (42.5 g). The flask was connected onto an apparatus with a flange lid, flange clip, mantle/Eurotherm/ thermocouple heating apparatus, and overhead stirrer with gland and paddle. The mixture was heated to 150° C. and then tetraethylenepentamine (TEPA) (11.9 g, 63 mmol, 1.02 equivalents) added via a dropping funnel over 15 minutes. The mixture was then heated with stirring at 150° C. for 4 hours. The product was then allowed to cool and poured into jars.

It was then made up into a package (15W-40) and gave the following viscometrics:

$V_{100}$=13.25 cSt $V_{-15}$=2570 cSt

The neat product had a nitrogen content of 1.39% an alkalinity value (AV) of 23.1 mgKOH/g,

Comparison Test 3

1 Step Using Low Conversion PIBSA

Exactly as in Example 3 except 173.4 g Hyvis PIBSA (65% conversion, 25% solution in SN150 lube oil, mixture of 40% MW 950, 60% MW 2300, 52 mmol, 0.85 equivalents) used.

Product had N content of 1.39%, AV of 29.9 mgKOHg$^{-1}$. When blended as a 15W-40 package $V_{100}$=13.51, $V_{-15}$=3010.

EXAMPLE 4

2 Step Using High Conversion PIBSA

The apparatus described for Example 3 was set up and charged with 183.4 g of "his" succinimide of Glissopal PIBSA and tetraethylene pentamine (made from 176.5 g PIB glissopal PIBSA as described in Example 3); 65 mmol, and 8 g TEPA, 43 mmol). To this was added 86.0 g of 25% PODMA solution in SN150 (62 mmol of repeating units) and 42.6 g of SN150 solvent. The reaction was heated at 150° C. for 4 hours. Then more TEPA (2.5 g, 13 mmol) added and the reaction heated at 150° C. for a further hour.

Product had an N content of 1.2% and an AV of 14.8 mgKOHg$^{-1}$. When blended as a 15W-40 oil it had a $V_{100}$ of 14.3 and $V_{-15}$ of 2810.

Comparison Test 4

2 Step Using Low Conversion PIBSA

As in Example 4 except using 183.4 g of bis succinimide of Hyvis PIBSA and TEPA (made from 6.2 g TEPA (33 mmol) and 177.2 g Hyvis PIBSA as described in Comparison Test 3), 53 mmol) with an extra 5 g TEPA, 26 mmol added during the reaction.

Product had an N content=1.27% AV=23.4 mgKOHg$^{-1}$. Blended as 15W-40, $V_{100}$=13.58, $V_{-15}$=2950.

Examples 3 and 4 and Comparison Tests 3 and 4 illustrate that products using "high conversion" PIBSA (i.e. greater than 75% starting PIB converted to PIBSA) give better viscometrics than products using "low conversion" PIBSAs.

The "1 step" process of Example 3 and Comparison Test 3 refers to the precursors of the succinimide (reactant (b)) i.e. the acyclic hydrocarbyl substituted acylating agent (PIBSA) and polyamine (TEPA) being added to the copolymer (reactant (a)) i.e. PODMA.

The "2 step" process of Example 4 and Comparison Test 4 refers to the preformed succinimide being added to the PODMA.

We claim:

1. A process comprising reacting at elevated temperature (a) a copolymer of an olefin and a compound having the structure

wherein X and $X^1$ are the same or different provided that at least one of X and $X^1$ is such that the copolymer can function as a carboxylic acylating agent, and (b) a succinimide prepared from an acyclic hydrocarbyl-substituted succinic acylating agent and a polyamine wherein the hydrocarbyl substituted succinic acylating agent is prepared by reacting a polyisobutene wherein greater than 50% of the residual olefinic bonds are represented by the formula —$CH_2$—$C(CH_3)$=$CH_2$ and a compound of formula I under conditions such that at least 75 mole % of the polyisobutene is converted to the hydrocarbyl-substituted succinic acylating agent.

2. A process as claimed in claim 1 wherein the hydrocarbyl substituted acylating agent is prepared by reacting said polyisobutene and compound of formula I under conditions such that at least 80 mole % of the polyisobutene is converted to the hydrocarbyl-substituted acylating agent.

3. A process as claimed in claim 2 wherein at least 85 mole % of the polyisobutene is converted to the hydrocarbyl-substituted succinic acylating agent.

4. A process as claimed in claim 1 wherein the hydrocarbyl substituted succinic acylating agent is prepared by reacting said polyisobutene with maleic anhydride.

5. A process as claimed in claim 1 wherein greater than 65% of the olefin double bonds of the PIB are vinylidene double bonds.

6. A process as claimed in claim 5 wherein greater than 80% of the olefin double bonds of the PIB are vinylidene double bonds.

7. A process as claimed in claim 1 wherein the PIB has a number average molecular weight in the range from about 500 to about 5,000.

8. A process as claimed in claim 1 wherein there is further reacted with (a) and (b) reactant (c) which is an amine of the formula:

wherein $R^1$ is either a saturated or an unsaturated aliphatic hydrocarbyl group, and $R^2$ is either $R^1$ or hydrogen and the total number of carbon atoms in the groups $R^1$ and $R^2$ is in the range 6 to 50.

9. A process as claimed in claim 1 wherein there is further reacted with (a) and (b) a compound having at least two primary and/or secondary amino groups separated by at least three carbon atoms.

10. A process as claimed in claim 9 wherein the compound having at least two primary and/or secondary amino groups separated by at least three carbon atoms is a polyalkylene polyamine.

11. A lubricating oil additive concentrate prepared by a process as claimed in claim 1.

12. A lubricating oil additive concentrate as claimed in claim 11 for use as a dispersant/VI improver.

13. A process comprising reacting at elevated temperature (a) a copolymer of an olefin of a compound having the structure

 (I)

wherein X and $X^1$ are the same or different provided that at least one of X and $X^1$ is such that the copolymer can function as a carboxylic acylating agent, (b) an acyclic hydrocarbyl-substituted succinic acylating agent prepared by reacting a polyisobutene wherein greater than 50% of the residual olefinic bonds are represented by the formula $-CH_2-C(CH_3)=CH_2$ and a compound of formula (I) under conditions such that at least 75% mole % of the polyisobutene is converted to the hydrocarbyl-substituted succinic acylating agent, and (c) an alkylene polyamine.

14. A lubricating oil additive concentrate prepared by a process as claimed in claim 13.

15. A process according to claim 13, wherein said reaction is carried out in a normally liquid substantially inert organic solvent.

* * * * *